H. M. UNDERWOOD.
ATTACHMENT FOR AUTOMOBILES FOR PREVENTING RATTLE AND WEAR.
APPLICATION FILED JULY 15, 1915.
1,173,228.
Patented Feb. 29, 1916.
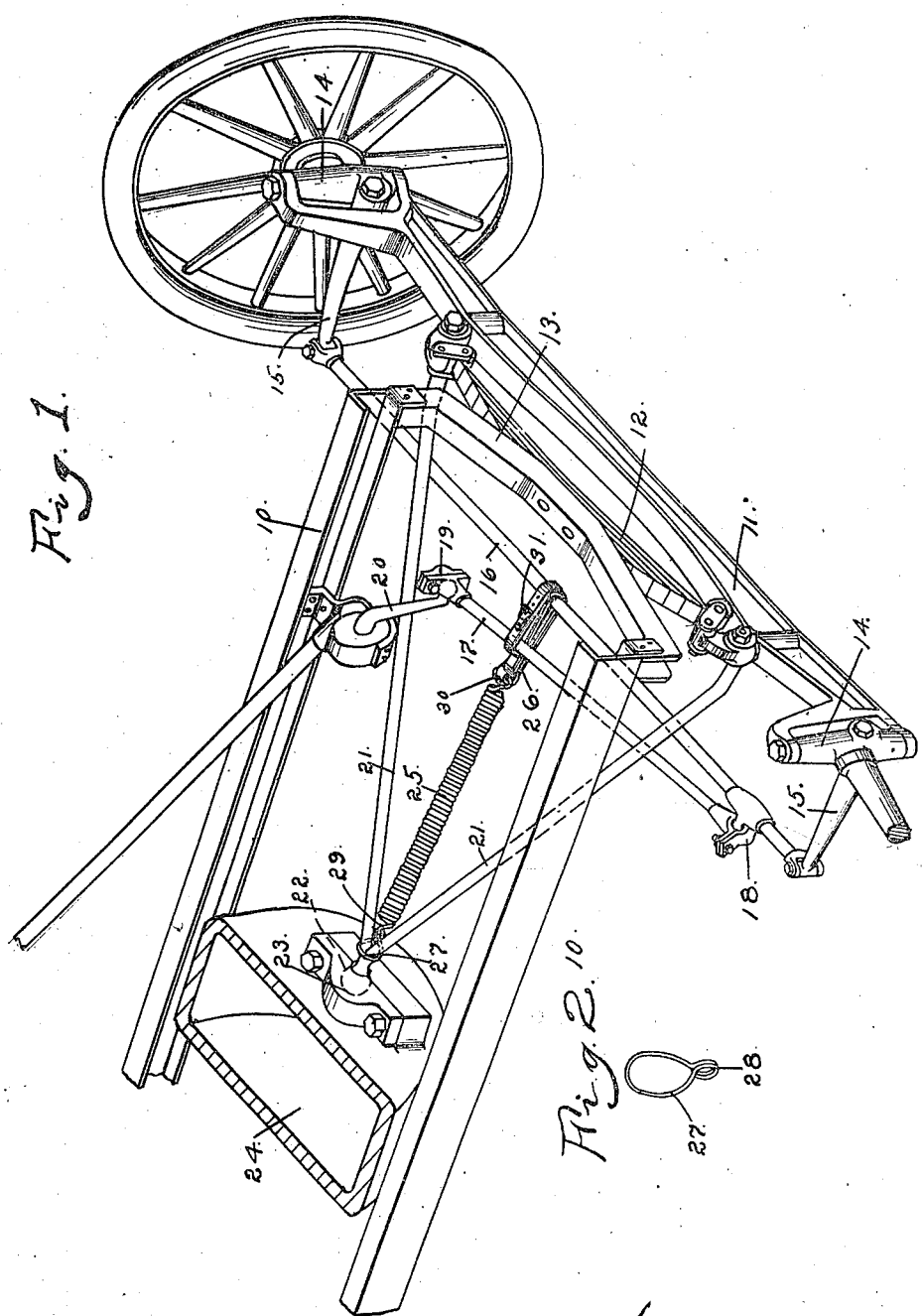

UNITED STATES PATENT OFFICE.

HENRY M. UNDERWOOD, OF WAUKEGAN, ILLINOIS, ASSIGNOR OF ONE-HALF TO CHARLES H. FOX, OF WAUKEGAN, ILLINOIS.

ATTACHMENT FOR AUTOMOBILES FOR PREVENTING RATTLE AND WEAR.

1,173,228.  Specification of Letters Patent.  Patented Feb. 29, 1916.

Application filed July 15, 1915. Serial No. 40,038.

*To all whom it may concern:*

Be it known that I, HENRY M. UNDERWOOD, a citizen of the United States, residing at Waukegan, in the county of Lake and State of Illinois, have invented certain new and useful Improvements in Attachments for Automobiles for Preventing Rattle and Wear, of which the following is a specification.

My invention relates to motor driven vehicles and its object is to provide a device for preventing the steering gear of a motor driven vehicle from rattling and for minimizing wear on the parts thereof, which device will be simple in its construction, economical to manufacture, easily attached to a car, and which, while effective to take up lost motion between the parts which it engages, will not interfere with or hamper said parts in their operative movements.

The invention is illustrated, in a preferred embodiment, in the accompanying drawing, wherein—

Figure 1 is a view, in perspective, of the forward end of the chassis of a motor car shown as equipped with a device constructed on the principles of my invention, and Fig. 2 is a detail view of the loop or ring by which the device is secured at one end thereof to the radius rods of the car.

In the drawing the side frame members of the chassis are indicated at 10.

11 is the front axle, 12 the front spring and 13 the forward cross member of the frame; the automobile shown being of the Ford type.

14, 14 are the steering knuckles, the arms 15 of which are connected by the usual tie bar 16.

17 is the drag link connected by a ball and socket joint 18 with the tie bar and by a similar joint 19 with the steering arm 20.

21, 21 are radius rods connected with the front axle and provided at their intersection with a ball 22 which enters a socket 23 on the casing 24.

The device of my invention, in its preferred form, comprises a helical spring 25 anchored at one end to the car and provided at the other end with a flexible band 26 which is adapted to engage, with spring 25 under tension, the transversely extending connecting rods of the steering gear, to-wit, the tie bar 16 and drag link 17, and take up lost motion between these rods and the parts to which they are connected so as to prevent rattle and minimize wear.

The device is preferably attached at the end remote from the tie bar and drag link to the radius rods 21 at their intersection so that it will also prevent rattle in the ball and socket joint 22, 23. The spring 25 is conveniently attached to the radius rods by means of a loop 27 (Fig. 2) the ends of which are formed with eyes 28 for a hook 29 on the end of the spring. The other end of the spring is formed with an eye, loop or hook 30 to receive the band 26. The latter is made of any suitable flexible material, such, for example, as leather, and its ends may be secured together adjustably by means of a buckle 31. The strap, when its ends are buckled together, is in the form of a loop consisting preferably of more than one turn of the band. One end of the loop passes through the eye 30 on the spring, the other end around the drag link 17. The loop is doubled over at the middle around the tie bar 16. The result of this preferred arrangement is that the stress of the spring is greater upon the relatively heavy tie bar 16 than upon the lighter drag link 17. The band has simply a sliding engagement with the bar and link. These members are quite free to move in the direction of their length through the band as the car is steered. The spring 25 being under tension when the device is attached to the car, any looseness and lost motion between the parts of the steering gear is taken up and vibration absorbed. This diminishes wear as well as eliminating noise.

It will be understood that my invention, although shown in connection with a Ford car, is susceptible of being used upon automobiles of other make. It will be understood furthermore that while the invention is described in what is considered to be a preferred embodiment, modifications might be made without departing from the principles of the invention. Therefore I do not intend to limit the invention to the precise details of construction shown and described except so far as the claims are expressly so limited.

I claim:

1. In combination with the steering gear of a motor driven vehicle comprising connecting rods, a resilient device for preventing rattle and wear which is anchored to the car and has a slidable engagement with said connecting rods so as to exert stresses transversely thereof.

2. In combination with the steering gear of a motor driven vehicle comprising the usual tie bar and drag link, a resilient device for preventing rattle and wear which is anchored to the car and has a slidable engagement with said drag link and tie bar so as to exert stresses transversely of the same which are greater against the tie bar than against the drag link.

3. In combination with the steering gear of a motor driven vehicle comprising connecting rods, a device for preventing rattle and wear comprising a spring anchored to the car, and a flexible band having a slidable engagement with said connecting rods so that the device exerts stresses transversely thereof.

4. In combination with the front axle, radius rods and steering gear connecting rods of a motor driven vehicle, a resilient device for preventing rattle and wear which is anchored to the radius rods and has a slidable engagement, under tension, with said connecting rods.

5. In combination with the front axle, radius rods and the steering gear connecting rods of a motor driven vehicle, a resilient device for preventing rattle and wear which consists of a spring anchored to the radius rods, and a flexible band attached to the spring and having a slidable engagement with the connecting rods so as to exert transverse stresses against the same.

6. In combination with the front axle, radius rods and the steering gear drag link and connecting bar of a motor driven vehicle, a device for preventing rattling and wear, consisting of a spring anchored to the radius rods and a flexible band having a slidable engagement with said drag link and connecting bar which exerts transverse stresses against the drag link and connecting bar which are greater against the latter than against the former.

7. In combination with the steering gear of a motor driven vehicle comprising connecting rods, a device for preventing rattle and wear comprising a spring anchored to the car and provided with an eye, a flexible band which extends through the eye and around said connecting rods separately with its ends fastened together.

8. In combination with the steering gear of a motor driven vehicle comprising connecting rods, a device for preventing rattle and wear comprising a spring anchored to the car and provided with an eye, and a flexible band which extends through the eye and around said connecting rods a plurality of times, with its ends fastened together.

9. In combination with the front axle, radius rods and the steering gear connecting rods of a motor driven vehicle, a device for preventing rattle and wear consisting of a spring anchored to the radius rods and provided with an eye, and a flexible band which extends through said eye and around said connecting rods separately a plurality of times, with its ends fastened together.

10. In combination with the usual steering gear tie bar and drag link of a motor driven vehicle, a device for preventing rattle and wear comprising a spring anchored to the car and formed with an eye and a flexible band in the form of a loop, one end of which passes through the eye of the spring and the other end around said drag link, said loop being folded upon itself around said tie bar.

11. In combination with the usual steering gear tie bar and drag link of a motor driven vehicle, a device for preventing rattle and wear comprising a spring anchored to the car and formed with an eye and a flexible band in the form of a loop consisting of a plurality of turns, one end of which loop passes through the eye of the spring and the other end around said drag link, said loop being folded upon itself around said tie bar.

12. In combination with the front axle, radius rods and the steering gear tie bar and drag link of a motor driven vehicle, a device for preventing rattle and wear which consists of a helical spring attached at one end to the radius rods at their intersection and formed at the other end with an eye, and a band in the form of a loop consisting of a plurality of turns, one end of which loop passes through the eye of the spring and the other end around said drag link, said loop being folded upon itself around said tie bar.

13. In combination with the steering gear of a vehicle comprising a tie bar, a device for preventing rattle and wear comprising a spring anchored to the car, and a flexible band joined to said spring, looped over said tie bar, and anchored to the car on the same side of the tie bar as the spring is anchored.

14. In combination with the steering gear of a vehicle comprising a drag link, a device for preventing rattle and wear in said link comprising a spring anchored to the car, and a flexible band connected to said spring and looped over said link so that a transverse stress is exerted upon the link.

HENRY M. UNDERWOOD.

Witnesses:
EDITH ERHARD,
BERT TOMPKINS.

Copies of this patent may be obtained for five cents each, by addressing the "Commissioner of Patents, Washington, D. C."